(12) United States Patent
Lake

(10) Patent No.: US 7,968,042 B2
(45) Date of Patent: Jun. 28, 2011

(54) METHOD AND APPARATUS FOR STEP-AND-REPEAT MOLDING

(75) Inventor: Rickie C. Lake, Meridian, ID (US)

(73) Assignee: Aptina Imaging Corporation, Grand Cayman (KY)

( * ) Notice: Subject to any disclaimer, the term of this patent is extended or adjusted under 35 U.S.C. 154(b) by 248 days.

(21) Appl. No.: 12/103,816

(22) Filed: Apr. 16, 2008

(65) Prior Publication Data
US 2009/0261516 A1    Oct. 22, 2009

(51) Int. Cl.
*B29C 43/56* (2006.01)
(52) U.S. Cl. ........ 264/571; 264/102; 264/494; 264/236; 264/255; 264/259; 264/234; 264/319; 264/1.24; 425/511; 425/129.1; 425/125; 425/127
(58) Field of Classification Search .................. 264/102, 264/494, 319, 1.24, 511; 425/125, 127
See application file for complete search history.

(56) References Cited

U.S. PATENT DOCUMENTS

| | | | |
|---|---|---|---|
| 4,073,654 A | 2/1978 | Wu | |
| 4,229,390 A | 10/1980 | Neefe | |
| 4,488,862 A * | 12/1984 | Epel et al. | 425/405.1 |
| 6,106,274 A * | 8/2000 | Ritchie et al. | 425/544 |
| 6,165,392 A | 12/2000 | Kobuchi et al. | |
| 6,218,458 B1 | 4/2001 | Vidaurre et al. | |
| 6,483,652 B2 | 11/2002 | Nakamura | |
| 6,656,393 B2 | 12/2003 | Yagi et al. | |
| 6,814,900 B2 | 11/2004 | Tumlin et al. | |
| 2006/0065998 A1 | 3/2006 | Takigawa | |

FOREIGN PATENT DOCUMENTS

JP           4175333        6/1992
WO    WO 2007/075406 A1    7/2007

* cited by examiner

*Primary Examiner* — Khanh Nguyen
*Assistant Examiner* — Margaret Squalls
(74) *Attorney, Agent, or Firm* — RatnerPrestia

(57) ABSTRACT

A method and apparatus for molding a structure on the top surface of a substrate. Mold material is dispensed onto an area of the top surface of the substrate. The mold apparatus is positioned over the area. The mold portion of the mold apparatus is positioned above the mold material and the mold material is surrounded with a shroud of the mold apparatus. A seal is formed between the shroud and the top surface of the substrate. The pressure is reduced within the shroud to below the ambient pressure. The mold portion of the mold apparatus is lowered toward the top surface of the substrate, so that at least the outer edge of the mold portion is in contact with the mold material. The pressure within the shroud is raised to at least the ambient pressure, and the mold material is cured to form the structure.

16 Claims, 18 Drawing Sheets

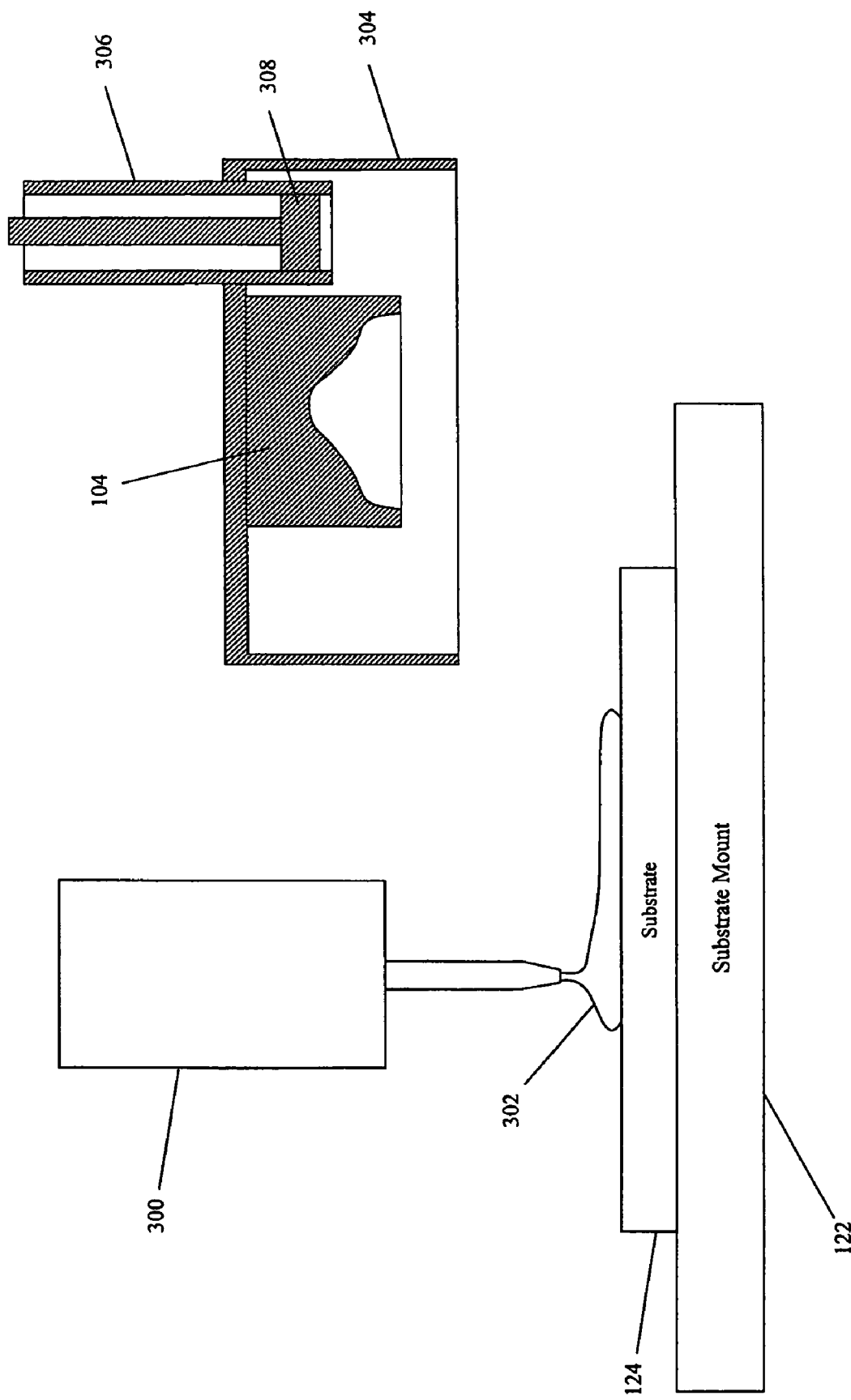

METHOD AND APPARATUS FOR STEP-AND-REPEAT MOLDING

FIELD OF THE INVENTION

The present invention relates to methods and apparatus for molding of structures on a surface. In particular, these methods and apparatus are useful for forming structures with high aspect ratios and for forming structures from mold materials with low viscosities and/or low thixotropic indices.

BACKGROUND OF THE INVENTION

The formation of molded structures on substrates may find applications in many fields. In particular, it is desirable to form wafer level molded structures on semiconductor wafers, such as optics lens masters for electrooptical components. Such molded structures may include high aspect ratio or highly aspheric lenses or other optical components. Not only may these structures have high aspect ratios, but they may also require high surface quality.

In order to achieve these high aspect ratios and/or high surface quality, mold materials having high viscosities may be used. These high viscosity mold materials may achieve high aspect ratios without problems due to material flow and wet-out associated with lower viscosity materials. However, it may be difficult to achieve high surface quality with high viscosity mold materials.

One method to improve the surface quality of structures molded from high viscosity mold materials is to increase the pressure at which the structure is molded. This approach may have drawbacks, such as wear on the mold, as well as the possibility that such high pressure molding may damage the potentially fragile substrate on which the structure is molded.

Another method to improve these structures may be to use mold materials that have both a high viscosity and a high thixotropic index. Such materials may have the robustness to hold high aspect ratio forms until cured, and still may potentially be molded with high surface quality at lower pressures.

Embodiments of the present invention provide an approach that allows molding of structures on substrates using mold materials that may have low viscosities and/or low thixotropic indices.

BRIEF DESCRIPTION OF THE DRAWINGS

According to common practice, the various features of the drawings are not to scale. On the contrary, the dimensions of the various features are arbitrarily expanded or reduced for clarity. Included in the drawing are the following figures:

FIGS. 3A, 3B, 3C, 3D, 3E and 3F are side cut-away drawings illustrating formation of a molded structure using another molding apparatus according to one embodiment of the present invention.

DETAILED DESCRIPTION OF THE INVENTION

Embodiments of the present invention use molding apparatus to form molded structures on the surface of the substrate. Methods and apparatus of these embodiments use changes in air pressure to draw mold material into features of the molds. This approach allows the production of molded structures with high aspect ratio features. For example, mold features with an aspect ratio greater than or equal to ½ (where the aspect ratio is equal to a maximum vertical dimension of the mold feature divided by its maximum horizontal dimension) may be formed using embodiments of the present invention. Such mold features may include the inverse of: aspherical lenses; high numerical aperture lenses; and lenses of microlens arrays.

Molded structures formed using embodiments of the present invention may exhibit improved fine surface feature quality and/or reduction in defects or voids in the molded structures due to a reduction of gas trapped during the molding process. Additionally, embodiments of the present invention allow for use of mold materials that have low viscosities and/or low thixotropic indices. For example, mold materials with viscosities less than about 1000 Pascal-seconds, or with thixotropic indices less than about 10 may be used. By allowing the use of mold materials with less desirable pre-curing mechanical properties, embodiments of the present invention may allow for use of mold materials with superior post-curing properties, such as more desirable electrical or optical properties.

Figure 1:
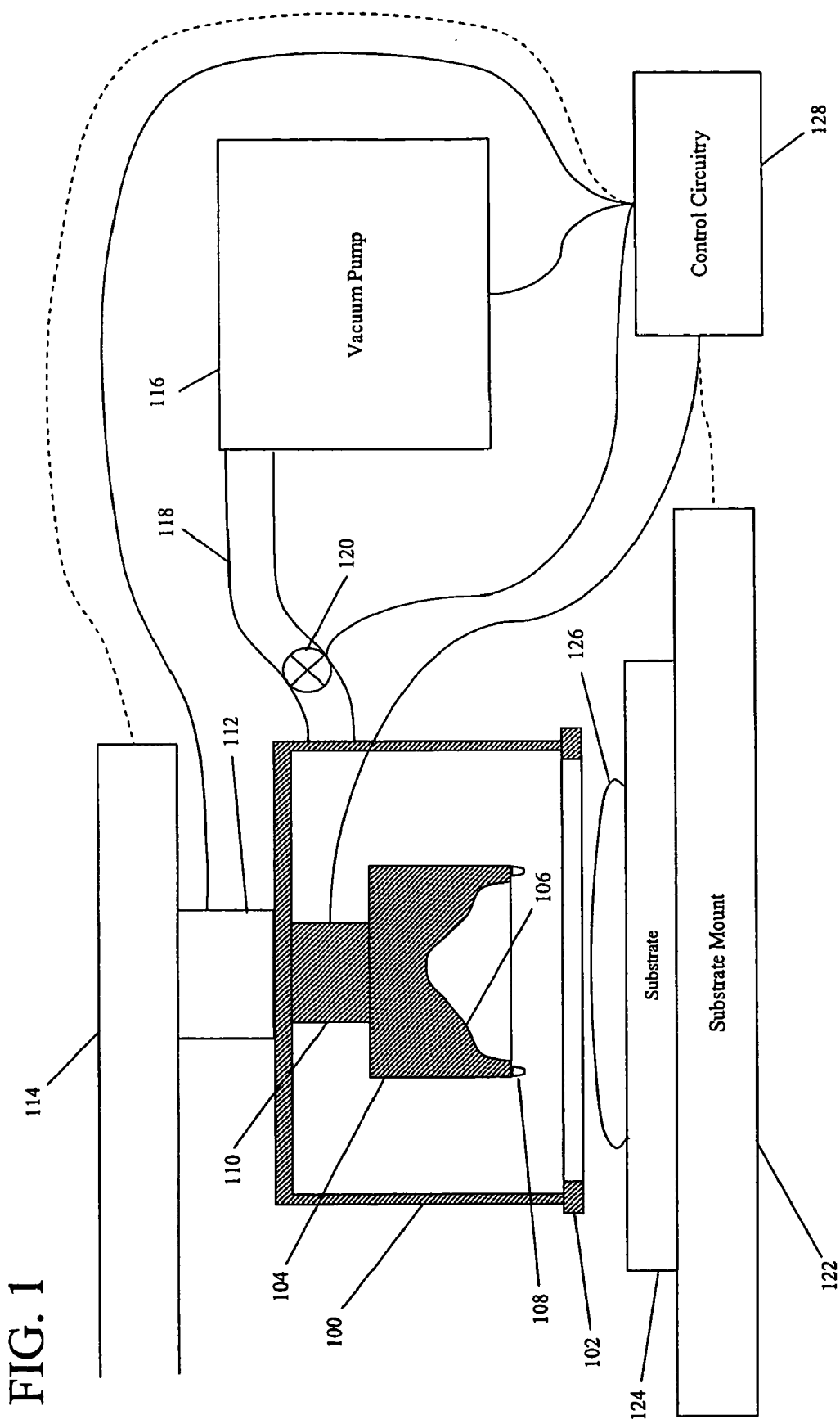
FIG. 1 is a side cut-away drawing illustrating a pin molding apparatus according to one embodiment of the present invention.

FIG. 1 illustrates one embodiment of the present invention, namely a pin mold apparatus. This pin mold apparatus includes: substrate mount 122; shroud 100; mold portion 104; vertical positioner 112; frame 114; vacuum pump 116; and control circuitry 128. The pin mold apparatus also includes a horizontal positioner in at least one of substrate mount 122 or frame 114.

It is noted that shroud 100 surrounds mold portion 104; however, shroud 100 and mold portion 104 are shown cut-away through the drawings for clarity. The use of cut-away drawings allows mold feature 106 and pins 108 of mold portion 104 to be shown more clearly.

Substrate mount 122 may be any type of mount used to hold substrate 124 during the molding process. Substrate mount 122 is coupled to frame 114 of the pin molding apparatus. As noted above, substrate mount 122 may include a horizontal positioner. It may also include a vertical positioner, in addition to vertical positioner 112 or in place of vertical positioner 112.

Shroud 100 includes a top end and side material extending from the top end to a bottom opening. The material of shroud 100 is substantially impermeable to air so that a pressure difference may be maintained between the interior space formed when the bottom opening of shroud 100 is covered by substrate 124 and the exterior environment. The side material of the shroud 100 may be rigid (as in shroud 100 of the embodiments shown in FIGS. 1 and 2A-D), vertically compressible (as in shroud 304 of the embodiments shown in FIGS. 3A-F) or vertically extendible (as in shroud 400 of the embodiments shown in FIGS. 4A-E); however, it is desirable for the side material of shroud 100 to substantially maintain its horizontal cross-section. This horizontal cross-section may be circular, elliptical, polygonal (e.g., rectangular) or another shape as desired. In the illustrated embodiments the horizontal cross-section of shroud 100 is shown as constant from the top end to the bottom opening; however, one skilled in the art will understand that this is for illustrative purposes and that the horizontal cross-section of shroud 100 may vary between the top end to the bottom opening.

In the embodiment of FIG. 1, shroud 100 also includes gasket 102, which is desirably formed of an elastic, substantially impermeable material. Gasket 102 is used to improve the seal between shroud 100 and substrate 124 when they are in contact. Desirably, gasket 102 may provide a substantially airtight seal when it is compressed against substrate 124.

Once the bottom opening of shroud 100 is sealed against the top surface of substrate 124, vacuum pump 116 may be used to reduce the pressure within the shroud below the ambient pressure, desirably to at least a medium vacuum. Valve 120 may be used to seal the shroud once the desired pressure reduction is achieved (as well as sealing the intake of vacuum pump 116 when the bottom opening of shroud 100 is not sealed) and allow air back into the shroud to raise the pressure back to ambient pressure when desired. Although valve 120, as shown in FIG. 1, is located in hose 118, which couples vacuum pump 116 to shroud 100, it is contemplated that a valve may be coupled between shroud 100 and the surrounding region to control the flow of air into the shroud.

Mold portion 104 is coupled below the top end of shroud 100 and is surrounded by the side material of the shroud. In the embodiments of FIGS. 1, 2A-D and 4A-E, mold portion 104 is coupled to shroud 100 by mold height positioner 110. As illustrated in FIGS. 2A-D and 4A-E, mold height positioner 110 allows mold portion 104 to be moved relative to the top end of shroud 100. In the embodiment of FIGS. 3A-F, mold portion 104 is held in a fixed position relative to the top end of shroud 100.

Figure 2A:
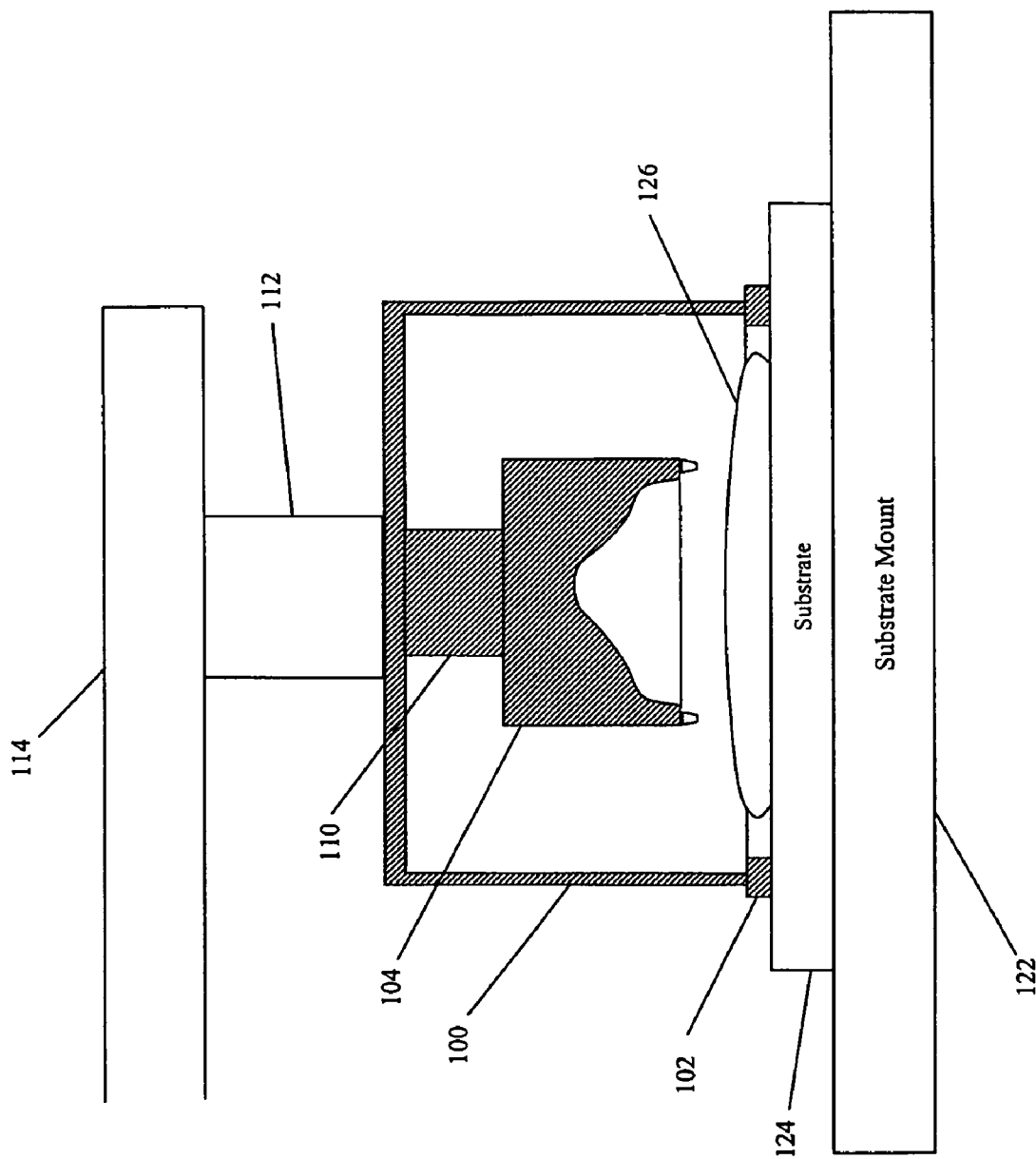
FIGS. 2A, 2B, 2C and 2D are side cut-away drawings illustrating formation of a molded structure using a pin molding apparatus according to the embodiment of FIG. 1.
Figure 2B:
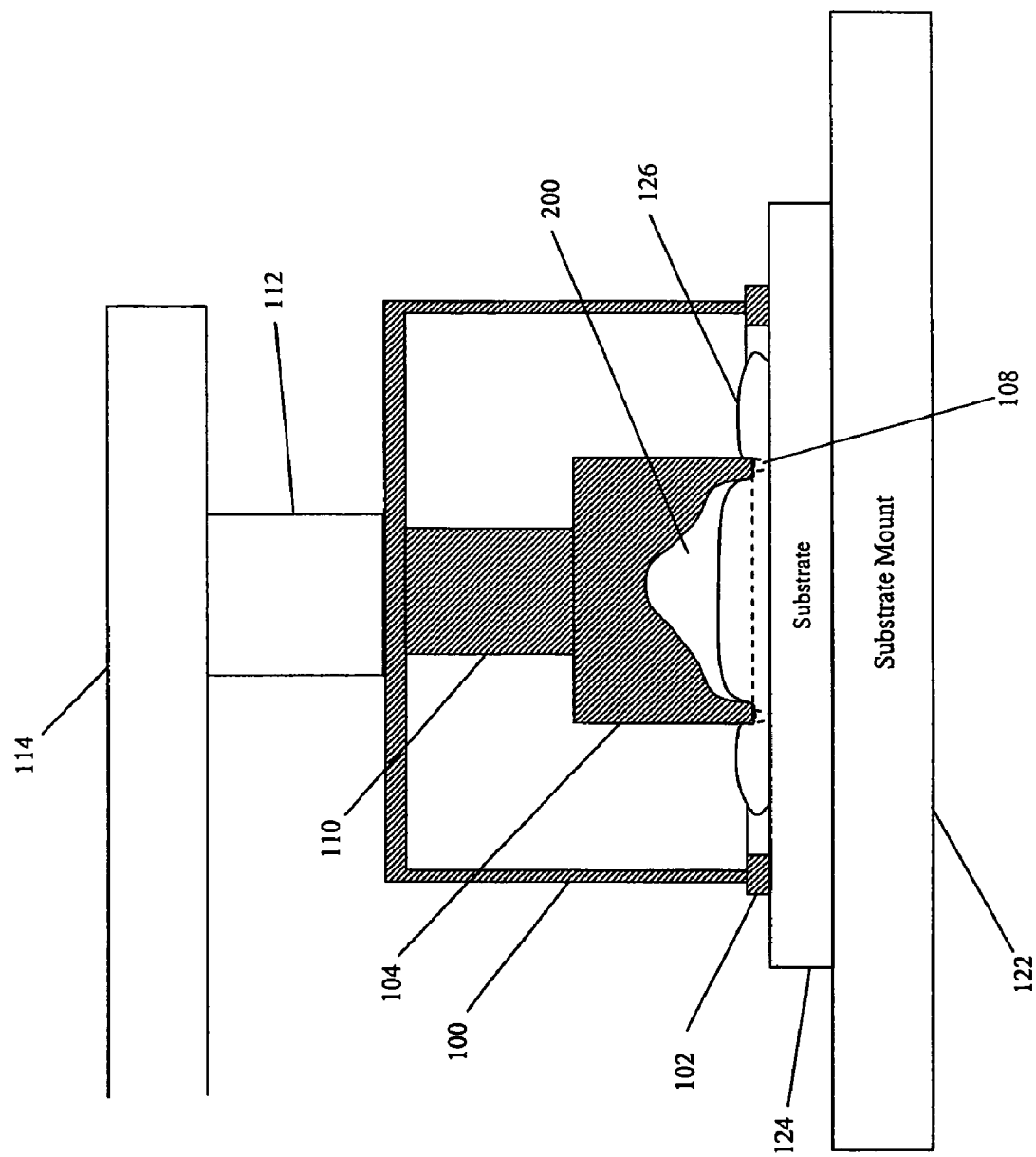

Mold portion 104 of the pin mold apparatus illustrated in FIGS. 1 and 2A-D, includes pins 108, which extend a predetermined distance below the outer edge of the bottom surface. As illustrated in FIG. 2B, when mold portion 104 is lowered into mold material 126, pins 108 hold the bottom surface of mold portion 104 at a desired height above the top surface of substrate 124. In the embodiments of FIGS. 3A-F and 4A-E, the desired separation between the bottom surface of mold portion 104 and the top surface of substrate 124 is achieved by control of the vertical positioners and/or mold height positioners of these embodiments.

As illustrated in FIG. 1, control circuitry 128 is electrically coupled to the horizontal positioner(s) (located in one, or both, of frame 114 or substrate mount 122), vertical positioner 112, mold height positioner 110, valve 120 and vacuum pump 116. This control circuitry may include: a general purpose computer, programmed to perform the steps of a molding process according to the present invention; special purpose circuitry; and/or application specific integrated circuitry (ASICs).

The vertical positioners, horizontal positioners and mold height positioners of the various embodiments of the present invention may include motorized translation stages, kinematic manipulators and/or piezoelectric elements. The vertical positioner(s) and horizontal positioner(s) are coupled to one or both of: substrate mount 122 or shroud 100 (and mold portion 104). The horizontal positioner(s) allow(s) shroud 100 and mold portion 104 to be moved relative to substrate 124 so that molded structure 202 (illustrated in FIGS. 2C, 2D, 3E, 3F, 4D and 4E) may be formed on a desired area of the top surface of substrate 124. Control circuitry 128 controls the horizontal positioner(s) to achieve the desired alignment.

Figure 2C:
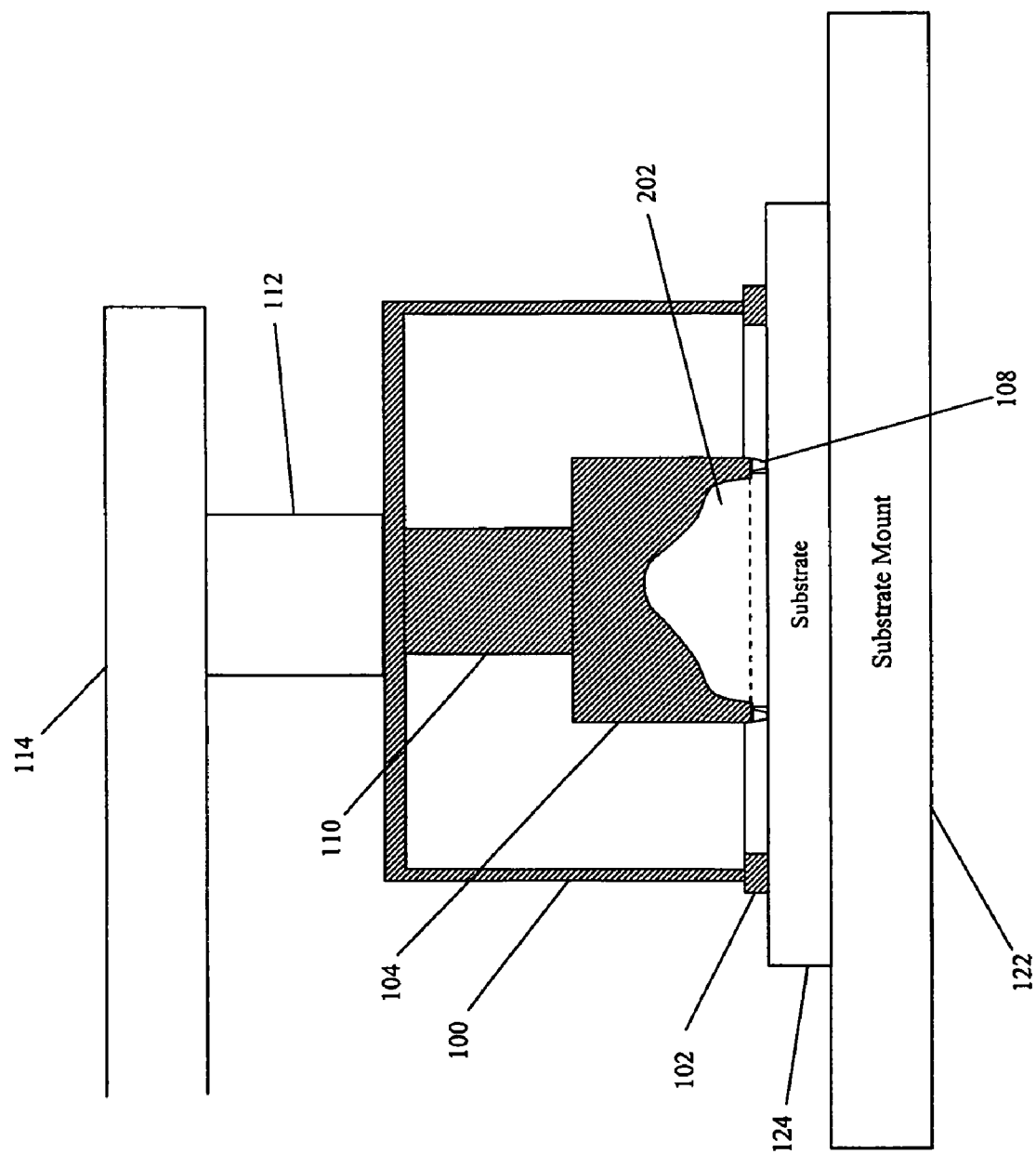
Figure 4A:
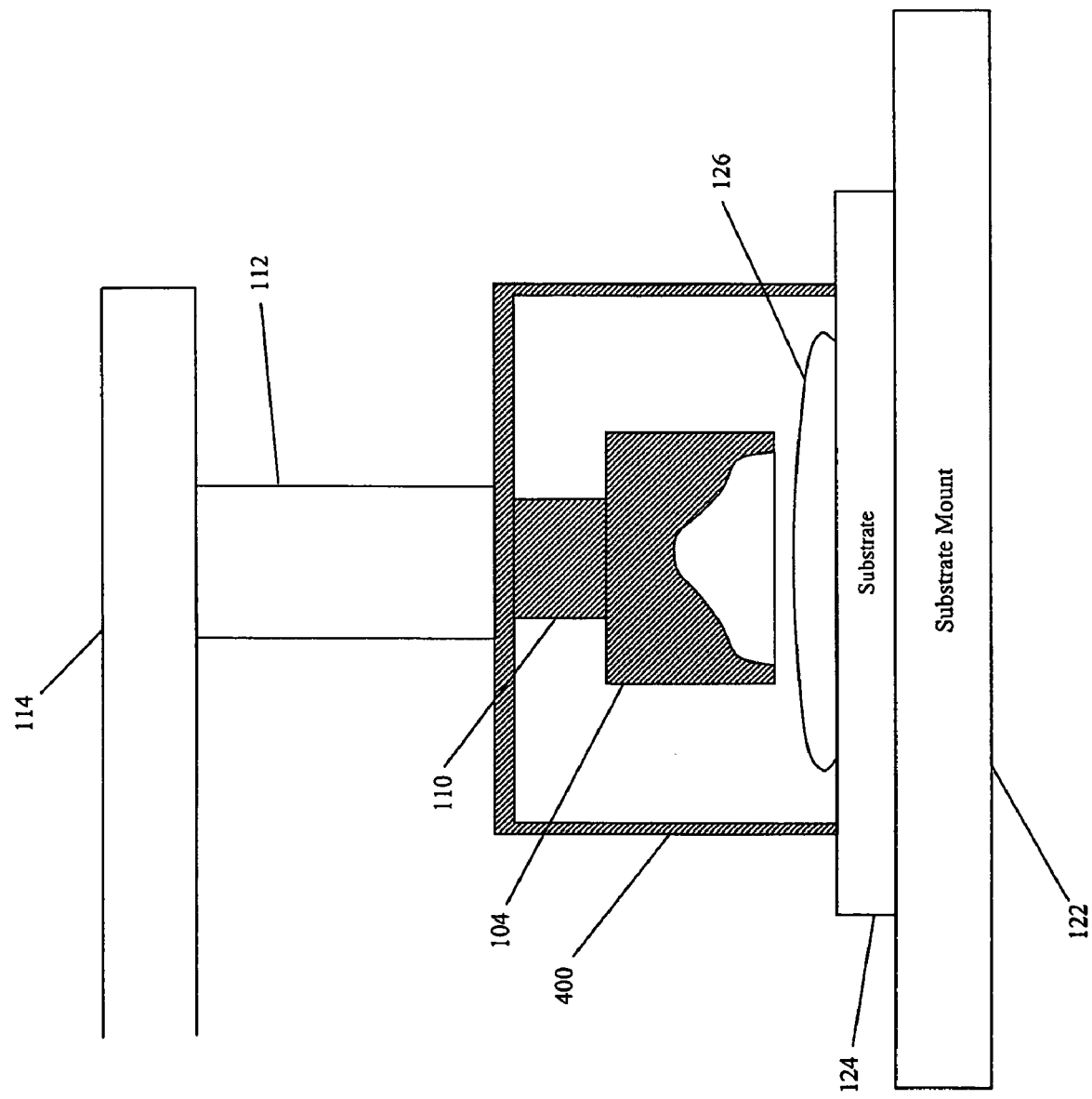
FIGS. 4A, 4B, 4C, 4D and 4E are side cut-away drawings illustrating formation of a molded structure using yet another molding apparatus according to one embodiment of the present invention.
Figure 4B:
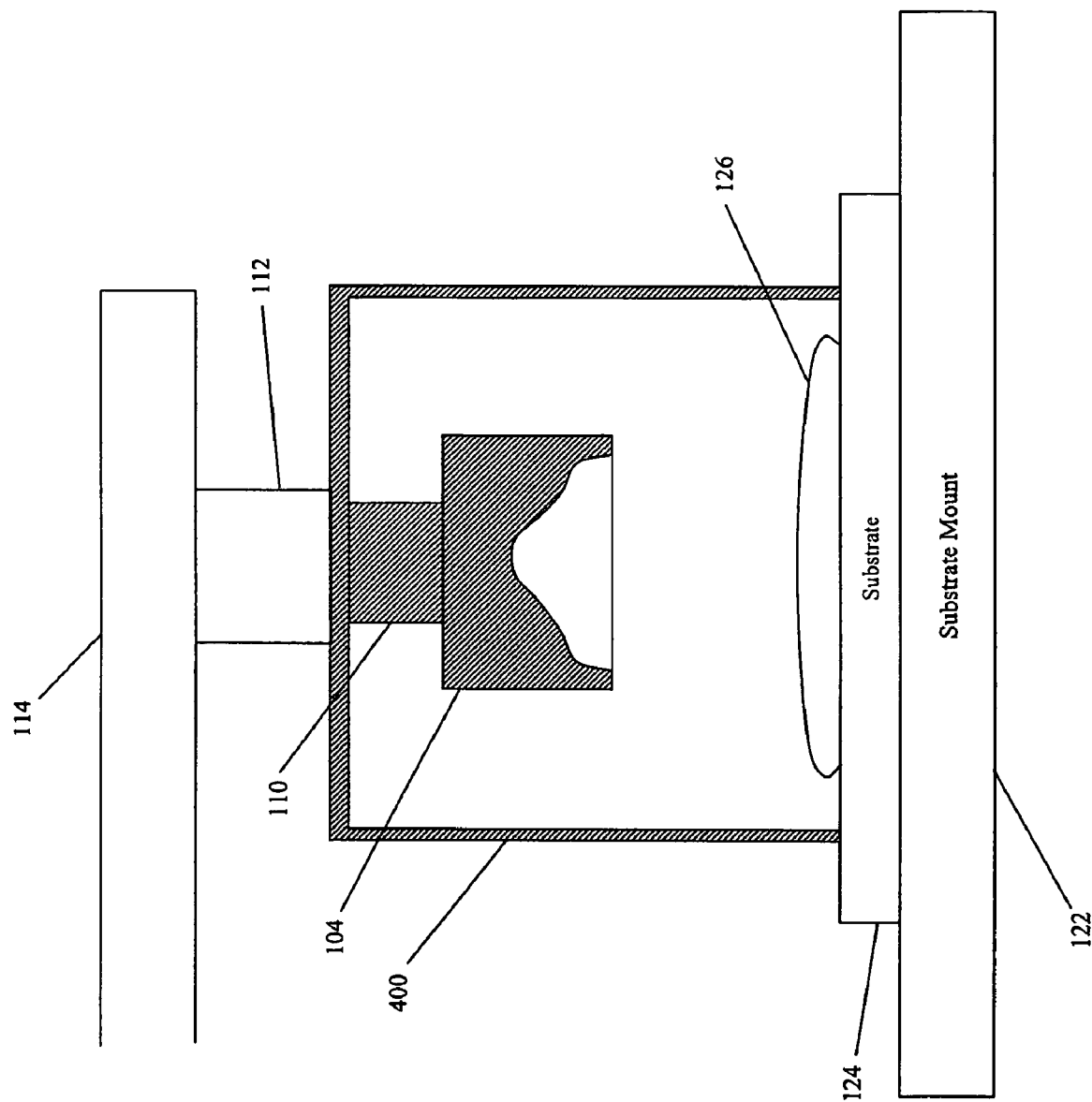
Figure 4C:
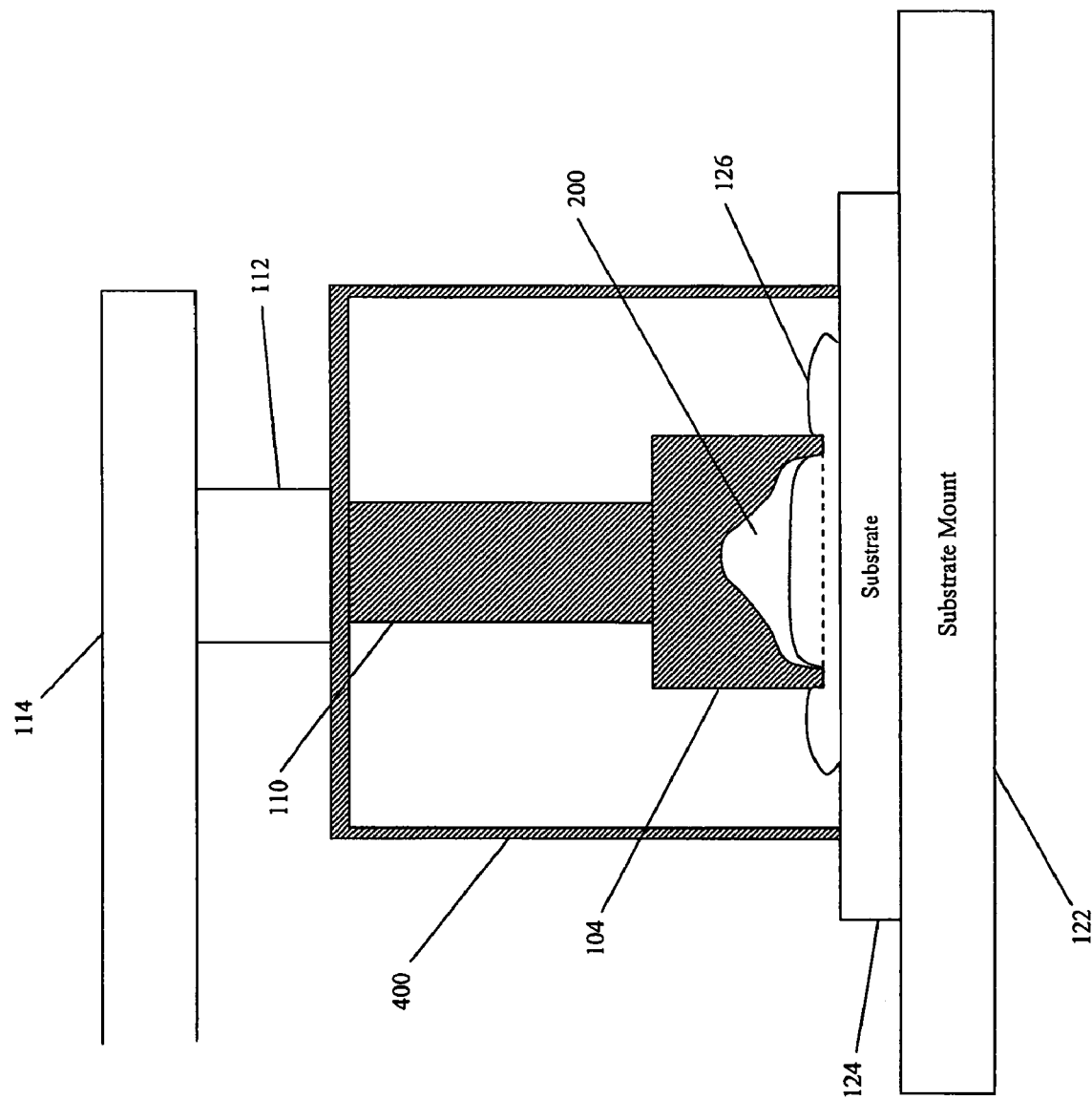
Figure 4D:
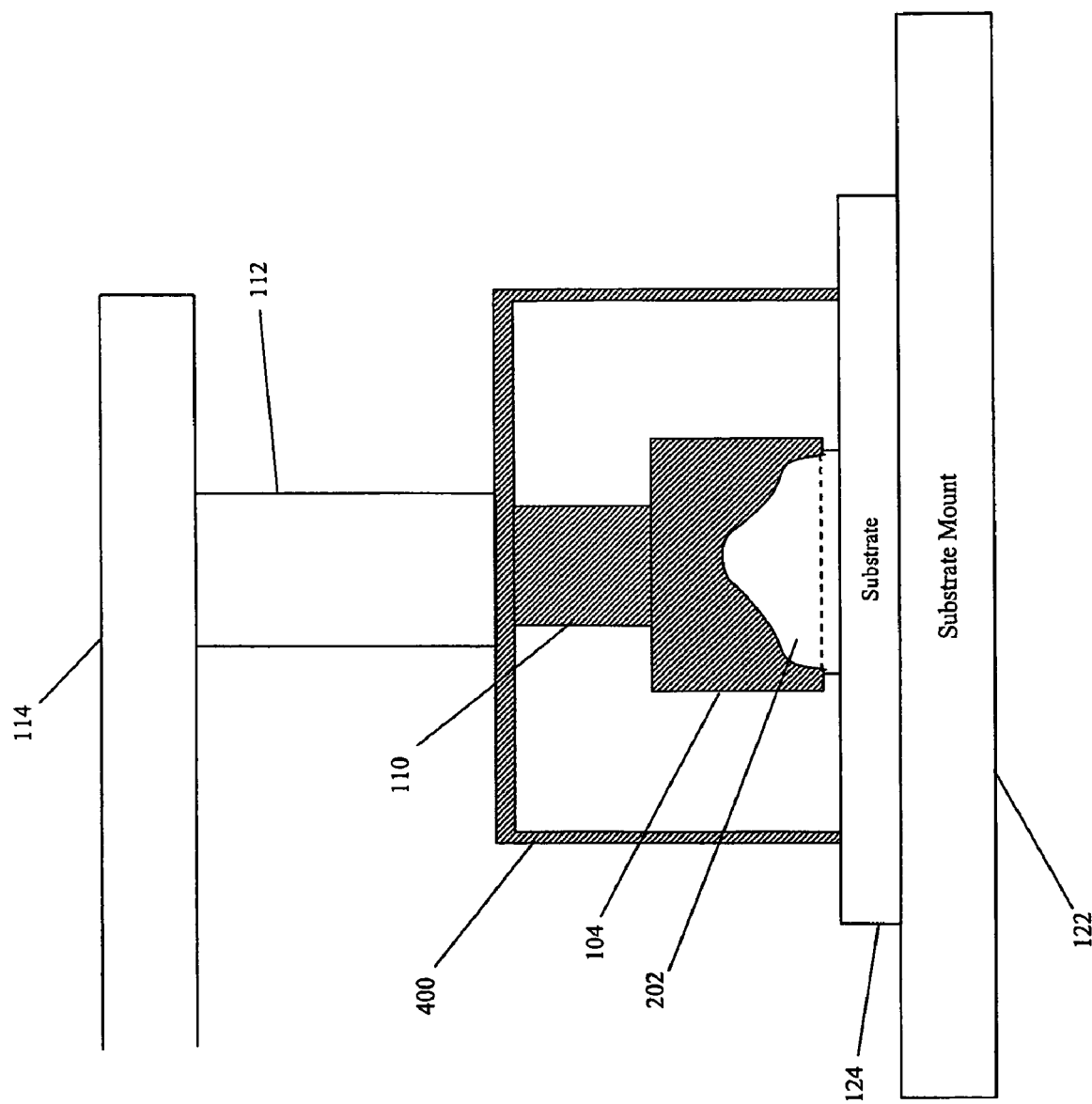
Figure 4E:
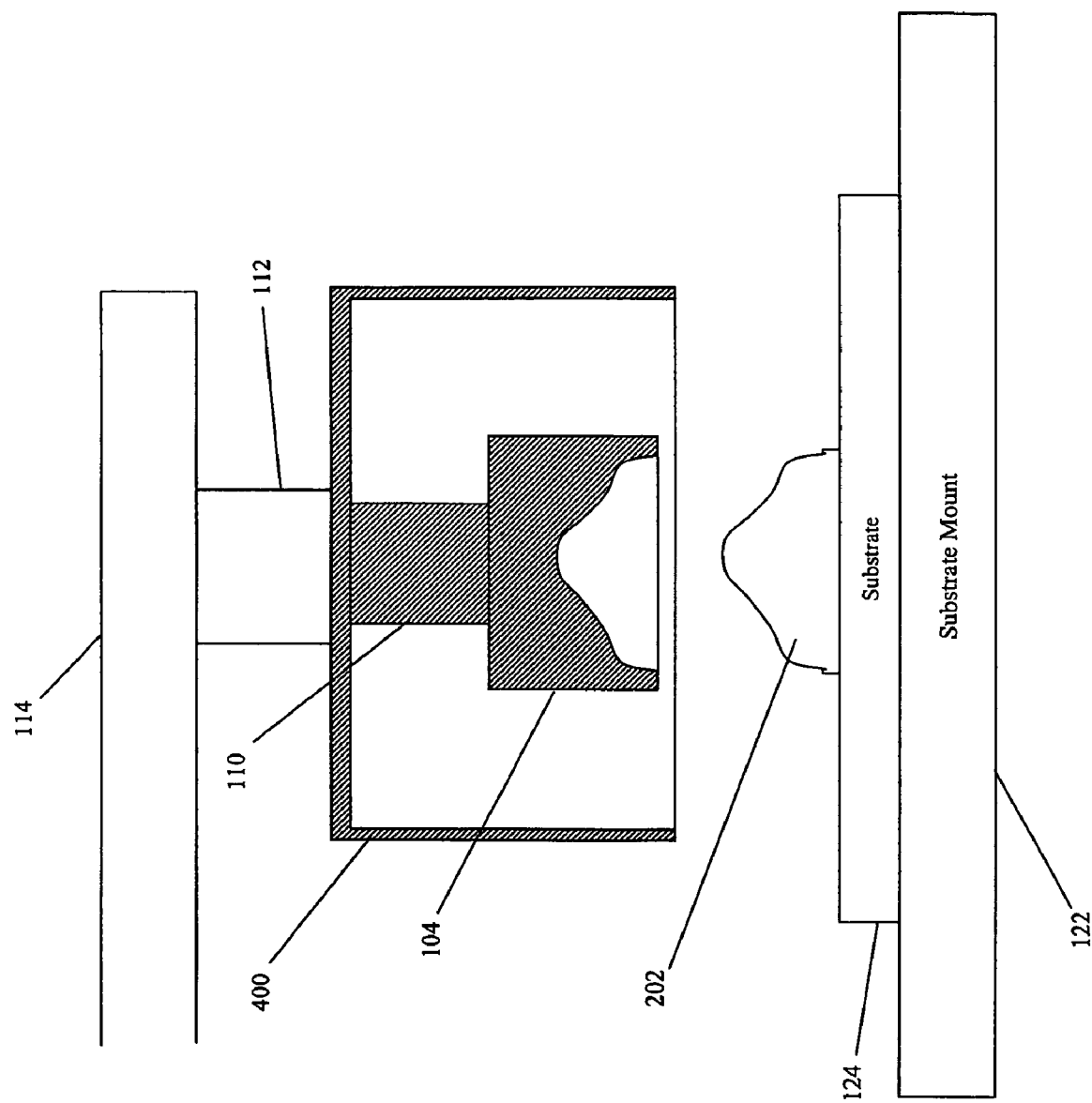
Figure 5:
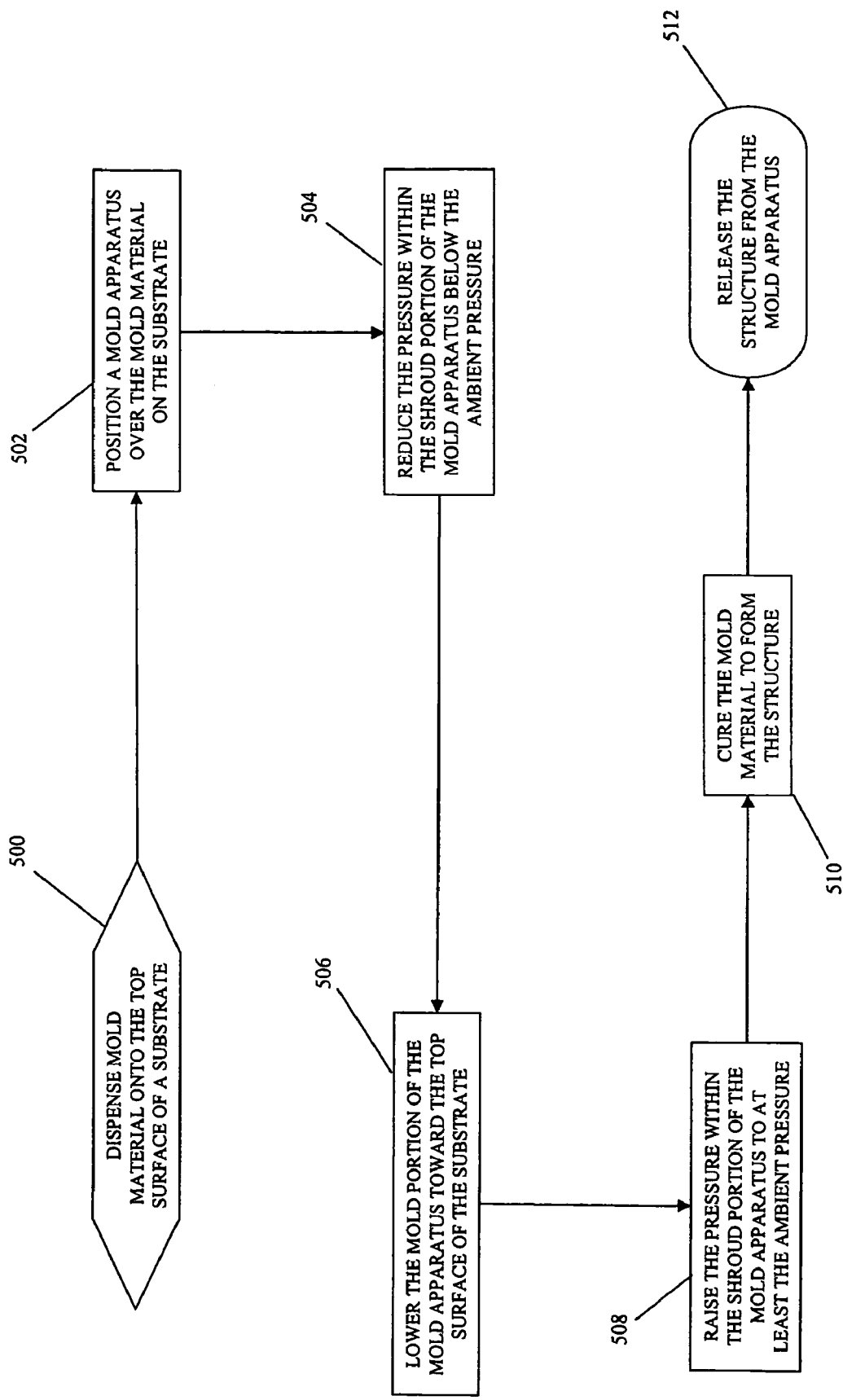
FIG. 5 is a flowchart illustrating a method for forming a molded structure using a molding apparatus according to one embodiment of the present invention.

FIG. 5 illustrates a molding method according to the present invention that may be used with the molding apparatus of FIGS. 1, 2A-D, 3A-F and 4A-E. The method begins with step 500, dispensing a predetermined volume of mold material onto a desired area of the top surface of a substrate. FIG. 3A illustrates one embodiment of this step. In the embodiment of FIG. 3A, mold material dispenser 300 dispenses a desired volume of mold material 302 on a desired area of the top surface of substrate 124 as it is held in substrate mount 122. Mold material dispenser 300 is desirably electrically coupled to, and controlled by, the control circuitry (not shown in FIG. 3A).

Figure 3B:
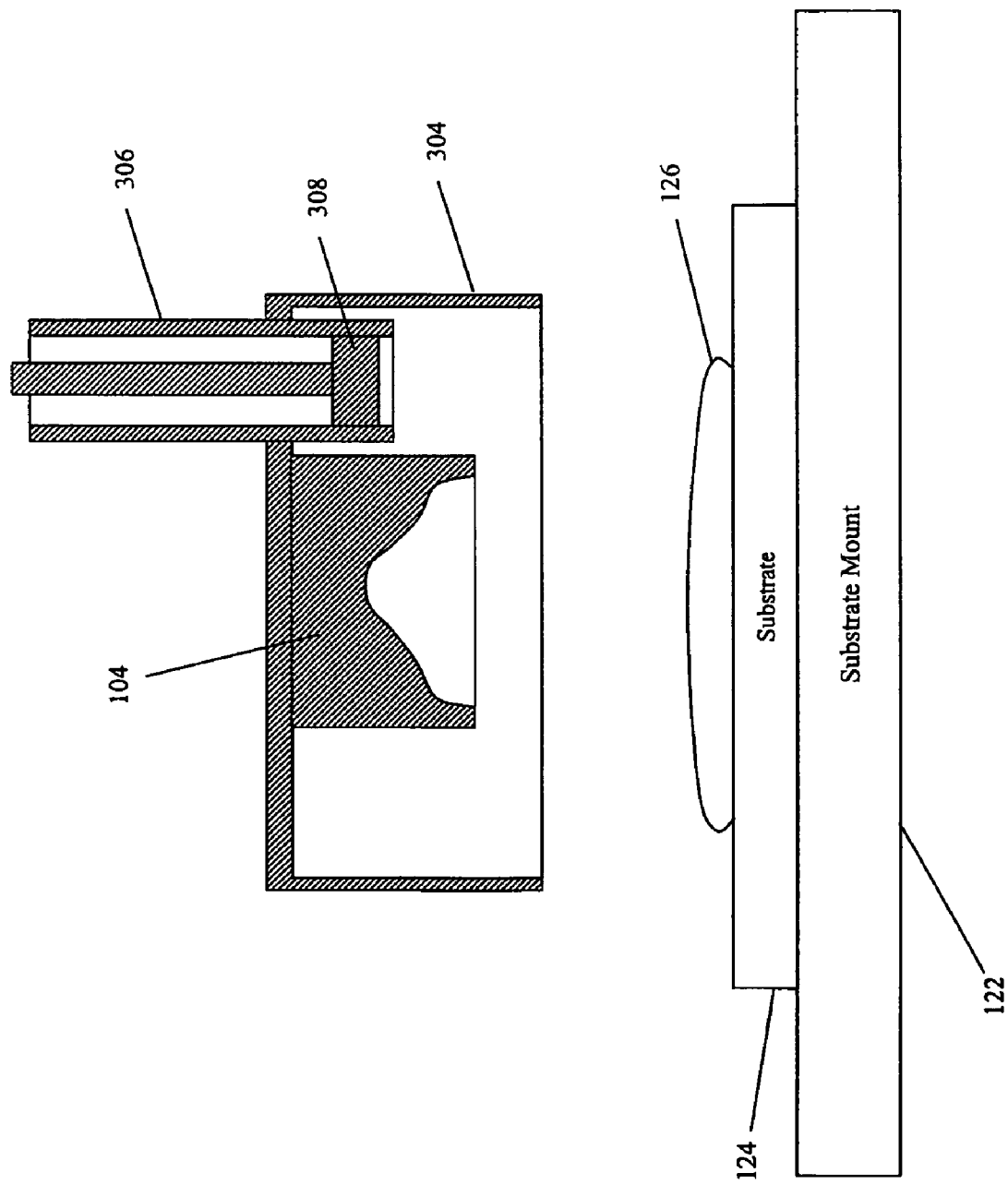

The mold apparatus is positioned by step 502 over the desired area of the top surface of substrate 124. The control circuitry controls the horizontal and vertical positioners to achieve the desired relative positioning. Using the horizontal positioner(s), the mold apparatus is horizontally aligned over the desired area such that the shroud of the mold apparatus surrounds mold material 126 and mold portion 104 is positioned above the mold material. FIGS. 1 and 3B illustrate mold apparatus according to the present invention that have been aligned over mold material 126, after the mold material is dispensed on the desired area of the top surface of substrate 124. Using the vertical positioner(s), the mold apparatus is vertically aligned such that the shroud forms a seal with the top surface with the top surface of substrate 124. As described above, it may be desirable for the shroud to include a gasket that may be compressed against the top surface of the substrate to form this seal. FIGS. 2A and 4A illustrate mold apparatus according to the present invention positioned according to step 502.

The pressure within the shroud of the mold apparatus is reduced in step 504 to below the ambient pressure. This reduction in pressure may be accomplished in a number of different ways. In one embodiment of the present invention (for example, using the mold apparatus of FIGS. 1 and 2A-D), a vacuum pump may be used to pump air out of the shroud and, thus, reduce the pressure within the shroud.

Figure 3C:
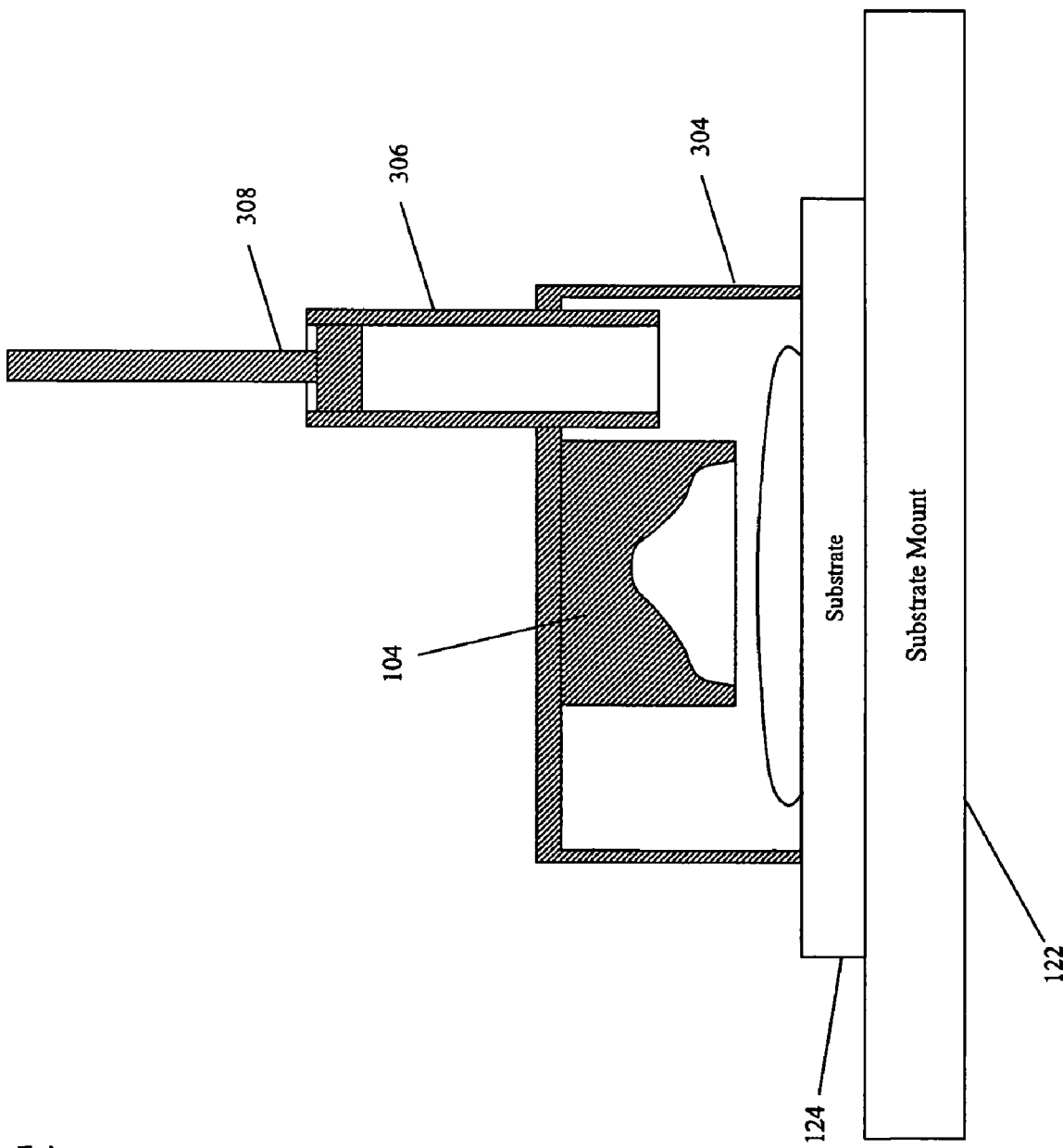

Alternatively, the pressure within the shroud of the mold apparatus may be reduced below the ambient pressure by increasing the volume of the shroud of the mold apparatus. For example, in the embodiment of FIGS. 3A-F, shroud 304 of the mold apparatus includes piston 308, which is moveably held in cylinder 306. As shown in FIG. 3C, piston 308 may be pulled outwardly to increase the interior volume of shroud 304 after the bottom opening of the shroud has been sealed against substrate 124, thus, reducing the pressure within shroud 304. In this embodiment, the motion of piston 308 may be desirably controlled by the control circuitry (not shown). FIGS. 4A and 4B illustrate another embodiment in which the volume of shroud 400 is increased by varying the height of shroud 400 from its top end to its bottom opening. The height of shroud 400 is variable between a first height (as illustrated in FIG. 4A) and a second height (as illustrated in FIG. 4B). This change in the height of shroud 400 may be accomplished, after shroud 400 is sealed to substrate 124, using vertical positioner 112.

While the pressure within the shroud is reduced, mold portion 104 is lowered by step 506 to a predetermined height above the top surface of substrate 124. In the embodiments illustrated in FIGS. 2B and 4C, mold height positioners 110 move mold portions 104 away from the top end of shrouds 100 and 400, respectively. In the embodiment illustrated in FIG. 3D, mold portion 104 is held in a fixed position relative to the top end of shroud 304 and the height of the shroud is compressed to lower mold portion 104 to the predetermined height above the top surface of substrate 124.

Figure 3D:
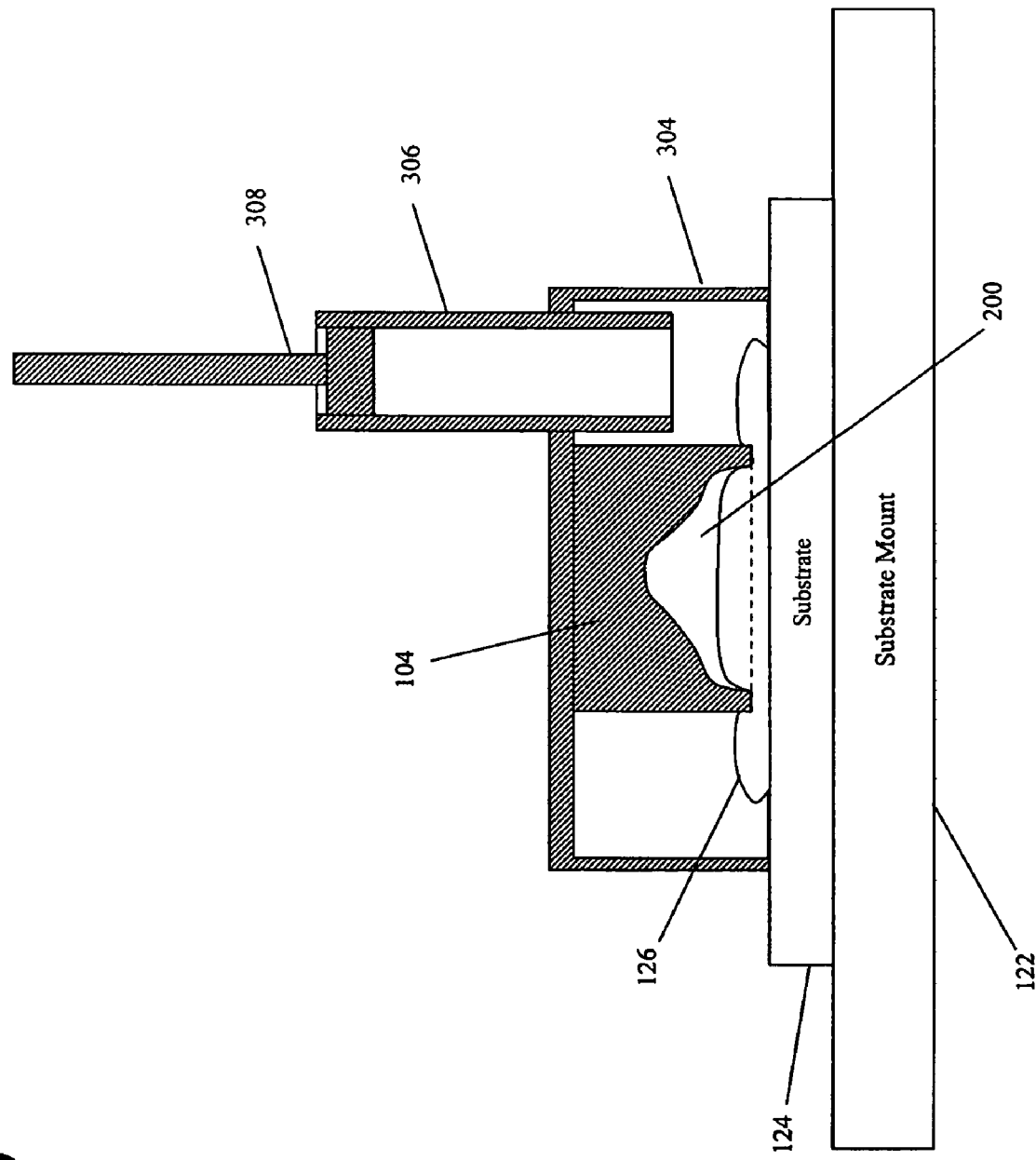

Although the bottom surface of mold portion 104 is not brought into contact with substrate 124 in step 506, at least an outer edge of mold portion 104 is brought into contact with mold material 126, as illustrated in FIGS. 2B, 3D and 4C. It is noted that, in the embodiment of FIG. 2B, mold portion 104 is desirably lowered until pins 108 are brought into contact with substrate 124; however, pins 108 do not obstruct mold material 126 from flowing into the mold feature(s) of mold portion 104. The desired separation of the outer edge of mold portion 104 from the top surface of substrate 124 is based on a number of factors, such as: the viscosity, thixotropic index, and density of mold material 126; the maximum height of the mold feature(s); and the pressure differential between the lowered pressure and the ambient pressure. Smaller separations may be desired for lower viscosity and/or higher thixotropic index mold materials and high aspect ratio mold features.

Figure 3E:
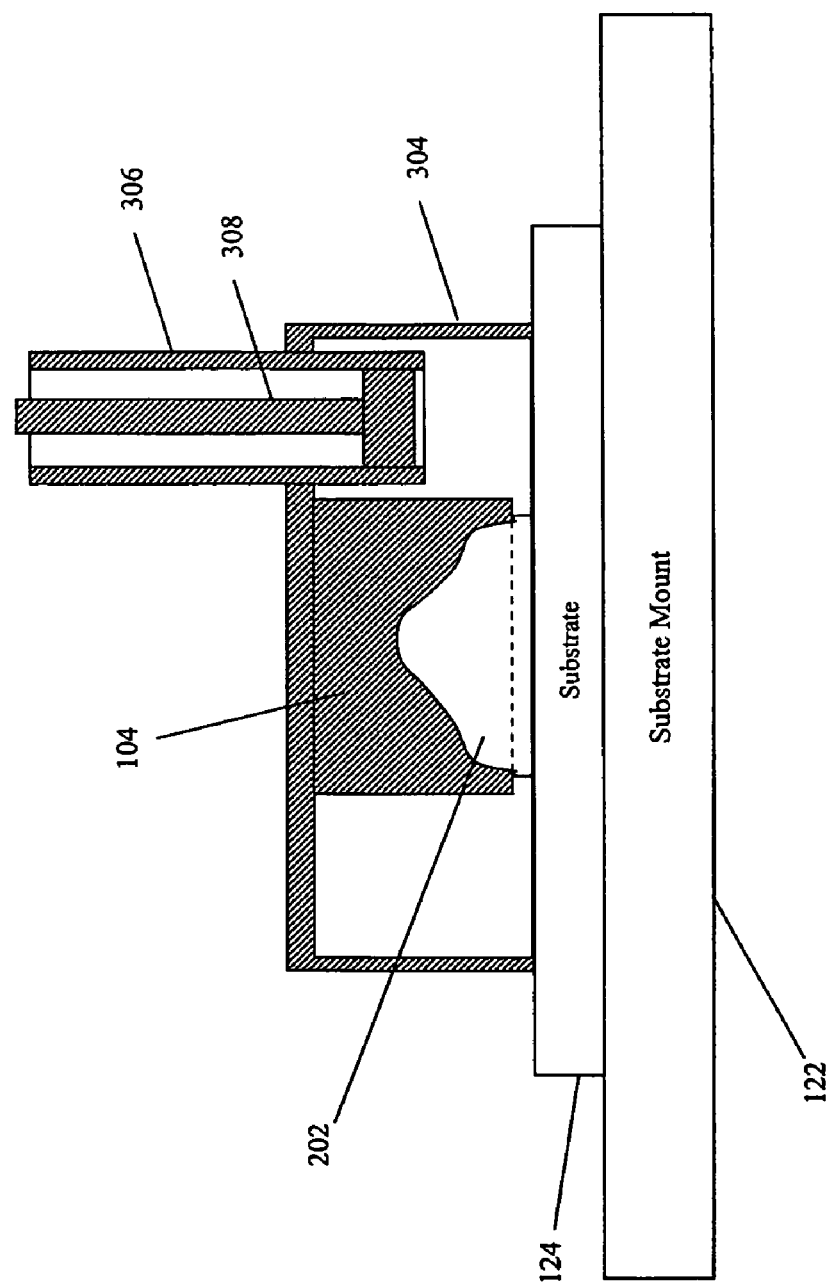

Once mold portion 104 is lowered into the desired position, the pressure in trapped pocket 200 is equal at the reduced pressure within the shroud. The pressure within the shroud of the mold apparatus is raised by step 508 back to at least the ambient pressure. Raising the pressure within the shroud pressure does not directly raise the pressure within trapped pocket 200. The difference in the pressure in the shroud and the pressure in trapped pocket 200 causes the mold material to be forced into the mold features of the bottom surface of mold portion 104 to form molded structure 202, as illustrated in FIGS. 2C, 3E and 4D. This occurs because a low pressure atmosphere is trapped in mold feature(s) 106 of mold portion 104 in step 506. When the pressure in the rest of shroud in increased in step 508, the mold material is desirably forced up into the mold feature(s). Because a lower pressure in trapped pocket 200 means that less air is trapped in the pocket, a lower pressure also leads to improved filling of mold features 106 by the mold material in step 508. Therefore, it is desirable for the pressure within the shroud to be significantly lowered in step 504. For example it may be desirable to achieve at least a medium vacuum in step 504, although for particularly high mold quality a high or even ultra-high vacuum may be desirable.

The pressure within the shroud may desirably be raised back to the ambient temperature, or may even be raised above the ambient pressure, i.e. overpressurized. Overpressurizing the air in the shroud may increase the mold quality by further decreasing the volume of any air that was trapped in the pocket in step 506.

Raising the pressure within the shroud may be accomplished in several ways, such as: opening a valve in the shroud; pumping air into the shroud; breaking the seal between the shroud and the top surface of the substrate; reducing the volume of the shroud or a combination thereof. It is noted that opening a valve to the ambient environment or breaking the seal between the shroud and the top surface of the substrate only raise the pressure within the shroud to the ambient pressure. Thus, these methods alone are not sufficient if overpressurization of the shroud is desired.

Both FIGS. 3E and 4D illustrate ways of reducing the volume of the shroud. In FIG. 3E, the volume of shroud 304 is reduced by pushing in piston 308. In FIG. 4D, the volume of shroud 400 is reduced by reducing the height of the shroud. Note that in the embodiment of FIG. 4D, as vertical positioner 112 extends to reduce the height of shroud 400, mold height positioner 110 must compress to maintain the desired separation between the outer edge of mold portion 104 and the top surface of substrate 124.

The mold material is then cured by step 510 to form molded structure 202. The curing process is dependent on the type of mold material used. Depending on the type of mold material used, any method of curing mold material known in the art, however, may be used, such as: irradiating the mold material with UV or IR radiation; heating the mold material; and/or waiting a predetermined period of time.

Figure 2D:
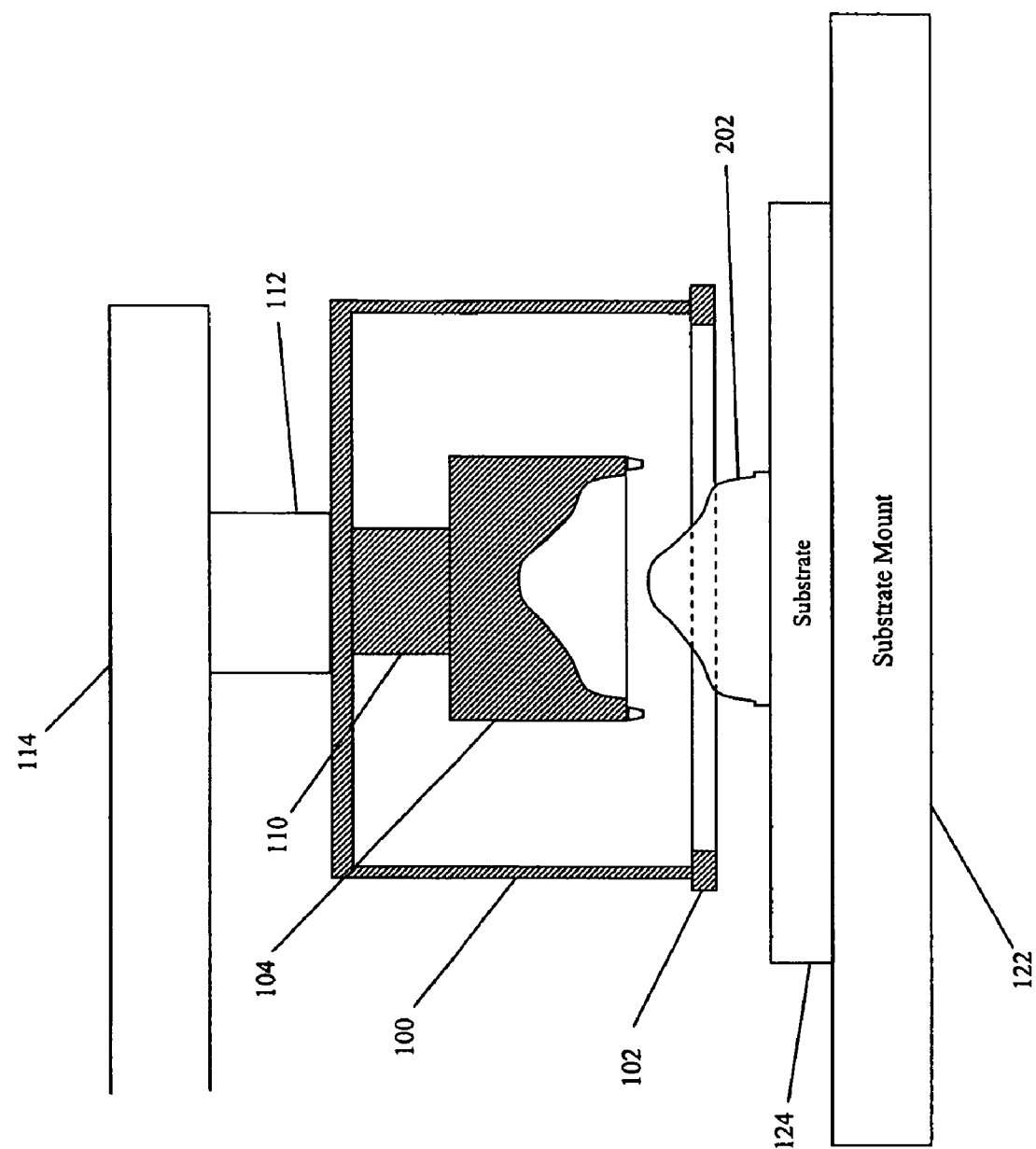
Figure 3F:
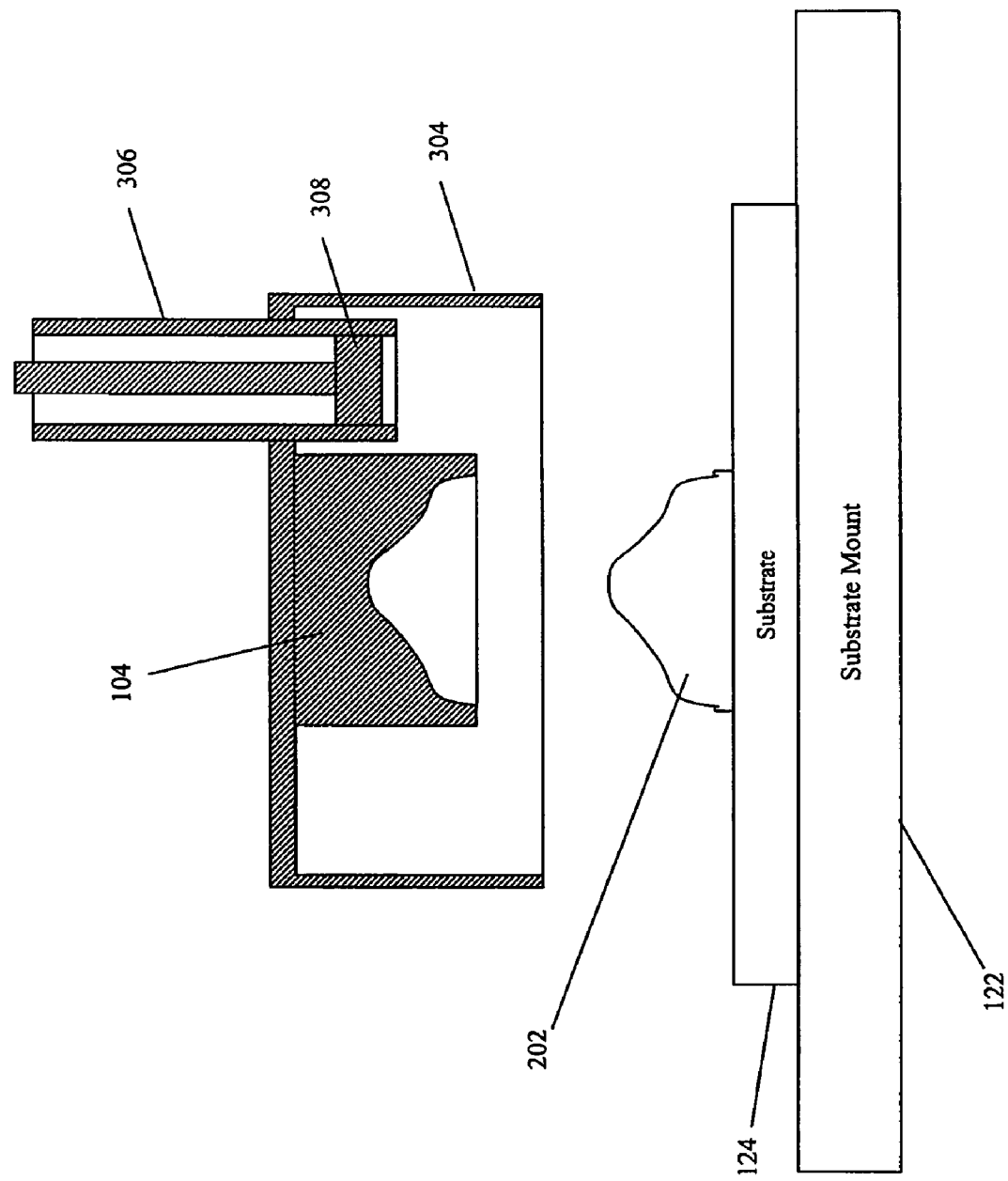

Once the mold material is sufficiently cured for molded structure 202 to maintain its shape outside of the mold, mold portion 104 of the mold apparatus is raised by step 512 to release the molded structure, as illustrated in FIGS. 2D, 3F and 4E. In the embodiments of FIGS. 2D and 4E, step 512 is accomplished using mold height positioner 110 and/or vertical positioner 112. In the embodiment of FIG. 3F, step 512 is accomplished using the vertical positioner.

Figure 6:
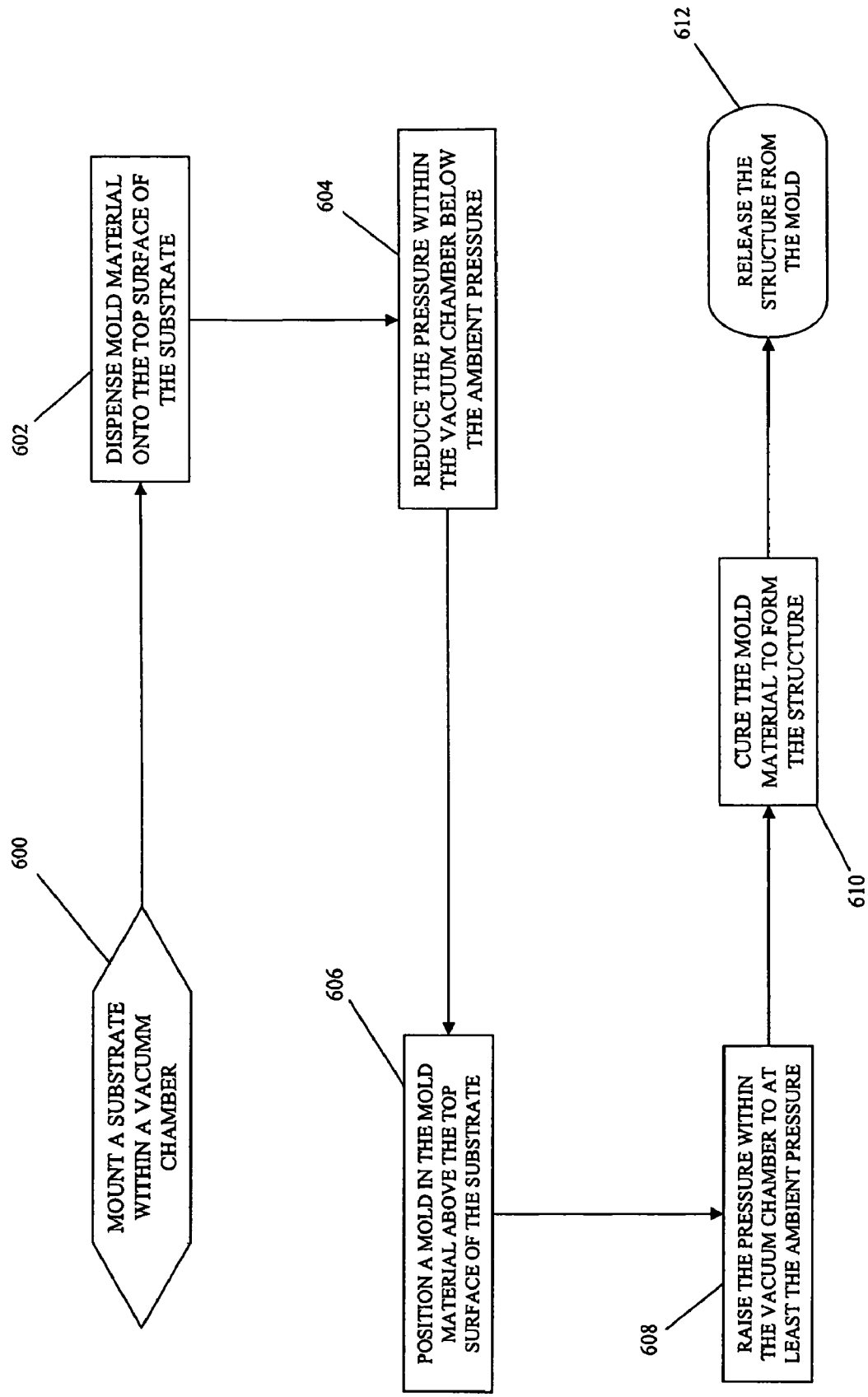
FIG. 6 is a flowchart illustrating another method for forming a molded structure using a molding apparatus according to one embodiment of the present invention.

FIG. 6 illustrates another method of molding structures on a top surface of a substrate according to the present invention. This embodiment is similar to the method of FIG. 5; however, the method of FIG. 6 uses a vacuum chamber, rather than a molding apparatus that includes a shroud surrounding the mold portion as is used in the embodiment of FIG. 5.

In the method of FIG. 6, the substrate is mounted within the vacuum chamber, step 600. A predetermined volume of mold material is dispensed by step 602 onto a desired area of the top surface of the substrate, and the pressure within the vacuum chamber is reduced by step 604 to below the ambient pressure. It is noted that the order of performing steps 602 and 604 is not fixed and they may be performed simultaneously or sequentially. Alternatively, the mold material may be dispensed onto the substrate (step 602) before the substrate is mounted in the vacuum chamber (step 600); however, the substrate is mounted in the vacuum chamber (step 600) before the pressure within the vacuum chamber is reduced (step 604).

A mold is then positioned by step 606 at a predetermined height above the area of the top surface of the substrate with at least the outer edge of the mold in contact with the mold material. The pressure within the vacuum chamber is then raised by step 608 to at least the ambient pressure. As in step 508 of the method of FIG. 5, step 608 desirably forces the mold material into the mold features of the mold.

The mold material is cured by step 610 to form the molded structure, and once the mold material is sufficiently cured for the molded structure to maintain its shape outside of the mold, the molded structure is released by step 612 from the mold.

It is noted that embodiments of the present invention may be used to form a series of molded structures on a substrate in a step-and-repeat process, as well as a single molded structure. After one molded structure is completed, the predetermined volume of the mold material is dispensed onto another area of the top surface of the substrate, the mold apparatus is stepped horizontally to position the mold apparatus over the other area of the top surface of the substrate, and the process is repeated.

Although the invention is illustrated and described herein with reference to specific embodiments, it is not intended to be limited to the details shown. Rather, various modifications may be made in the details within the scope and range of equivalents of the claims and without departing from the invention. Specifically, it is contemplated that features of the several disclosed embodiments may be used in different combinations to form further embodiments.

What is claimed:

1. A method of molding a structure on a top surface of a substrate using a mold apparatus, comprising the steps of:
    dispensing mold material onto an area of the top surface of the substrate;
    positioning a mold portion of the mold apparatus above the mold material;
    surrounding the mold material with a shroud of the mold apparatus;

forming a seal between the shroud of the mold apparatus and the top surface of the substrate;

reducing pressure within the shroud of the mold apparatus below an ambient pressure;

lowering the mold portion of the mold apparatus toward the top surface of the substrate having the mold material while the pressure is reduced to below the ambient pressure, wherein at least an outer edge of the mold portion is in contact with the mold material;

after lowering the mold portion of the mold apparatus, raising the pressure within the shroud of the mold apparatus from below the ambient pressure to at least the ambient pressure, wherein raising the pressure within the shroud of the mold apparatus from below the ambient pressure to at least the ambient pressure causes the mold material to be forced into features of a bottom surface of the mold portion; and curing the mold material to form the structure.

2. A method according to claim 1, wherein the mold material has at least one of a low viscosity or a low thixotropic index.

3. A method according to claim 2, wherein:
the viscosity of the mold material is less than about 1000 Pascal-seconds; or
the thixotropic index of the mold material is less than about 10.

4. A method according to claim 1, wherein positioning the mold apparatus includes compressing a gasket of the shroud of the mold apparatus against the top surface of the substrate to form the seal.

5. A method according to claim 1, wherein reducing the pressure within the shroud of the mold apparatus below the ambient pressure includes pumping air out of the shroud.

6. A method according to claim 1, wherein reducing the pressure within the shroud of the mold apparatus below the ambient pressure includes increasing a volume of the shroud of the mold apparatus.

7. A method according to claim 6, wherein raising the pressure within the shroud of the mold apparatus to at least the ambient pressure includes reducing the volume of the shroud.

8. A method according to claim 1, wherein lowering the mold portion of the mold apparatus includes the steps of:
holding the mold portion in a fixed position relative to a top end of the shroud; and
compressing a height of the shroud to lower the mold portion toward the top surface of the substrate.

9. A method according to claim 1, wherein lowering the mold portion of the mold apparatus includes moving the mold portion away from a top end of the shroud to lower the mold portion toward the top surface of the substrate.

10. A method according to claim 1, wherein:
the mold portion of the mold apparatus includes at least one pin extending from the outer edge of the mold portion; and
lowering the mold portion includes lowering the mold portion until the at least one pin is in contact with the top surface of the substrate.

11. A method according to claim 1, wherein raising the pressure within the shroud of the mold apparatus to at least the ambient pressure includes at least one of:

opening a valve in the shroud;
pumping air into the shroud; or
breaking the seal between the shroud and the top surface of the substrate.

12. A method according to claim 1, wherein curing the mold material includes at least one of:
waiting a predetermined period of time;
irradiating the mold material with UV radiation;
irradiating the mold material with IR radiation; or
heating the mold material.

13. A method according to claim 1, further comprising the step of:
raising the mold portion of the mold apparatus to release the structure.

14. A method according to claim 13, further comprising the steps of:
dispensing additional mold material onto a further area of the top surface of the substrate;
stepping the mold apparatus horizontally to position the mold apparatus over the further area of the top surface of the substrate such that:
the shroud of the mold apparatus surrounds the mold material and forms a seal with the top surface; and
the mold portion of the mold apparatus is positioned above the additional mold material;
reducing a pressure within the shroud of the mold apparatus below the ambient pressure;
lowering the mold portion of the mold apparatus toward the top surface of the substrate, wherein at least the outer edge of the mold portion is in contact with the additional mold material;
raising the pressure within the shroud of the mold apparatus to the ambient pressure; and
curing the additional mold material to form a further structure on the top surface of the substrate.

15. A method of molding a structure on a top surface of a substrate, comprising the steps of:
mounting the substrate within a vacuum chamber;
dispensing mold material onto an area of the top surface of the substrate;
reducing pressure within the vacuum chamber below an ambient pressure;
positioning a mold above the area of the top surface of the substrate having the mold material while the pressure is reduced to below the ambient pressure, wherein at least an outer edge of the mold is in contact with the mold material;
after positioning the mold, raising the pressure within the vacuum chamber from below the ambient pressure to at least the ambient pressure, wherein raising the pressure within the vacuum chamber from below the ambient pressure to at least the ambient pressure causes the mold material to be forced into features of a bottom surface of the mold; and
curing the mold material to form the structure.

16. A method according to claim 15, wherein reducing the pressure within the vacuum chamber below the ambient pressure produces at least a medium vacuum within the vacuum chamber.

* * * * *